United States Patent
Singh et al.

(10) Patent No.: US 8,250,638 B2
(45) Date of Patent: Aug. 21, 2012

(54) MAINTAINING THE DOMAIN ACCESS OF A VIRTUAL MACHINE

(75) Inventors: Vikas Singh, San Jose, CA (US); Ashish K. Hanwadikar, Sunnyvale, CA (US); Robert F. Deuel, Menlo Park, CA (US); Shiqi Charlie Sun, San Jose, CA (US); Hui Li, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 405 days.

(21) Appl. No.: 12/697,659

(22) Filed: Feb. 1, 2010

(65) Prior Publication Data

US 2011/0191834 A1    Aug. 4, 2011

(51) Int. Cl.
*H04L 29/06* (2006.01)

(52) U.S. Cl. .................. 726/6; 726/2; 726/5; 726/18

(58) Field of Classification Search .................. 726/6, 18
See application file for complete search history.

(56) References Cited

U.S. PATENT DOCUMENTS

| | | | | |
|---|---|---|---|---|
| 5,944,825 | A * | 8/1999 | Bellemore et al. | 726/18 |
| 6,343,299 | B1 * | 1/2002 | Huang et al. | 707/638 |
| 6,684,293 | B1 * | 1/2004 | Backman et al. | 711/111 |
| 6,959,313 | B2 * | 10/2005 | Kapoor et al. | 707/649 |
| 7,035,881 | B2 * | 4/2006 | Tummala et al. | 707/639 |
| 7,251,732 | B2 * | 7/2007 | Jamieson et al. | 713/182 |
| 7,653,669 | B2 * | 1/2010 | Kapoor et al. | 707/649 |
| 7,752,180 | B1 * | 7/2010 | Fair et al. | 707/690 |
| 8,027,958 | B1 * | 9/2011 | Chapman | 707/679 |
| 8,055,614 | B1 * | 11/2011 | Vaikar | 707/610 |
| 8,121,981 | B2 * | 2/2012 | Simek et al. | 707/649 |
| 8,126,859 | B2 * | 2/2012 | Rath et al. | 707/695 |
| 2002/0166067 | A1 * | 11/2002 | Pritchard et al. | 713/201 |
| 2009/0119538 | A1 * | 5/2009 | Scales et al. | 714/6 |
| 2009/0172326 | A1 * | 7/2009 | Sandorfi | 711/162 |
| 2009/0172781 | A1 * | 7/2009 | Masuoka et al. | 726/3 |
| 2009/0199294 | A1 * | 8/2009 | Schneider | 726/18 |
| 2010/0076932 | A1 * | 3/2010 | Lad | 707/639 |
| 2010/0107163 | A1 * | 4/2010 | Lee | 718/1 |
| 2010/0114825 | A1 * | 5/2010 | Siddegowda | 707/638 |
| 2010/0211547 | A1 * | 8/2010 | Kamei et al. | 707/649 |

* cited by examiner

*Primary Examiner* — Ponnoreay Pich

(57) ABSTRACT

A method for maintaining domain access of a virtual machine is described. According to one embodiment, a generation of a new computer account password by an operating system is identified. The new computer account password is copied to an auxiliary storage location. An existing computer account password is replaced with the new computer account password when it is determined that a file system of the computer has been restored to a previous state. The copying of the new computer account password may be performed in response to the generation of the new computer account password. The replacing of the existing computer account password may be performed in response to the restoring of file system to the previous state.

24 Claims, 5 Drawing Sheets

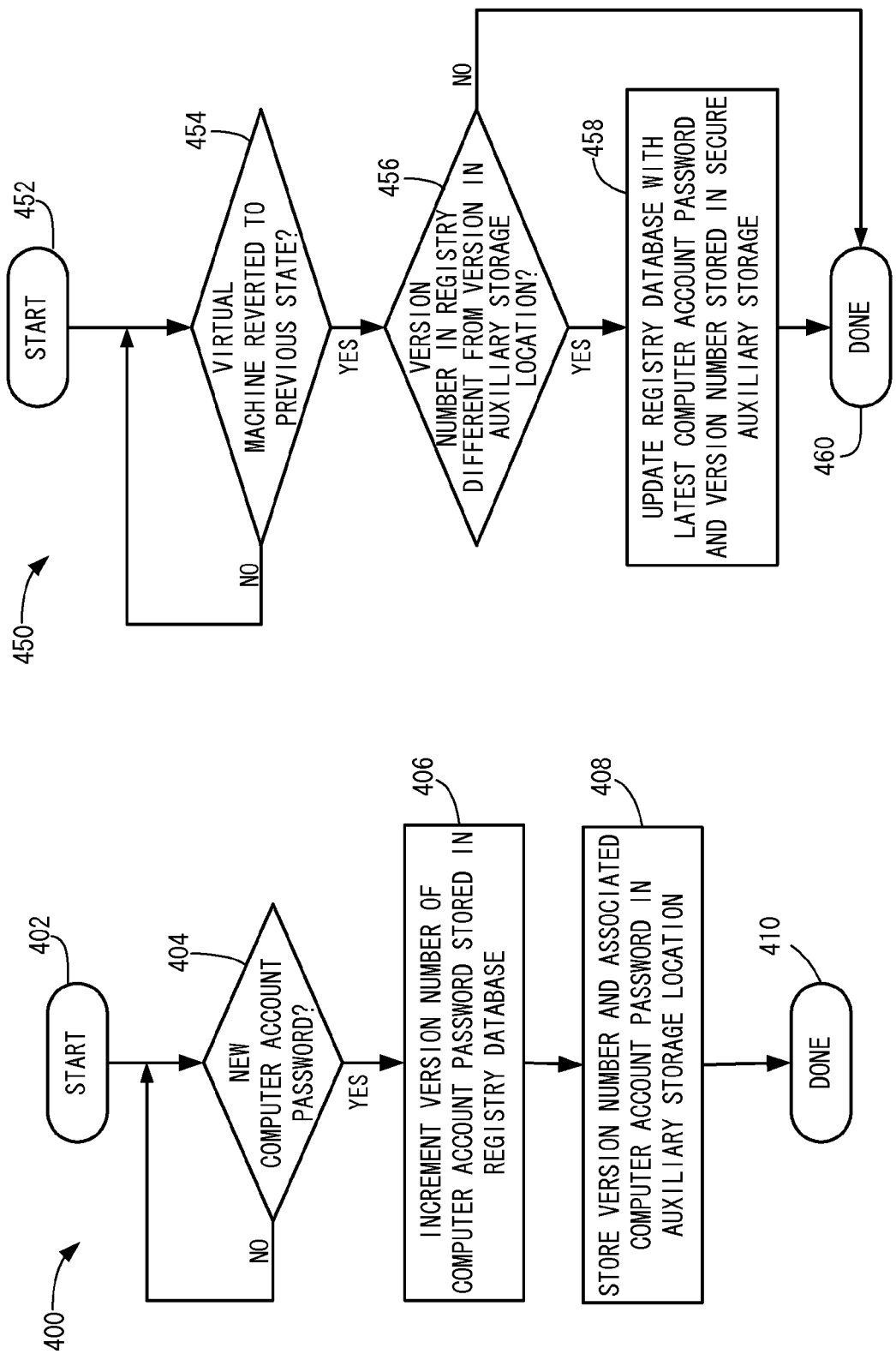

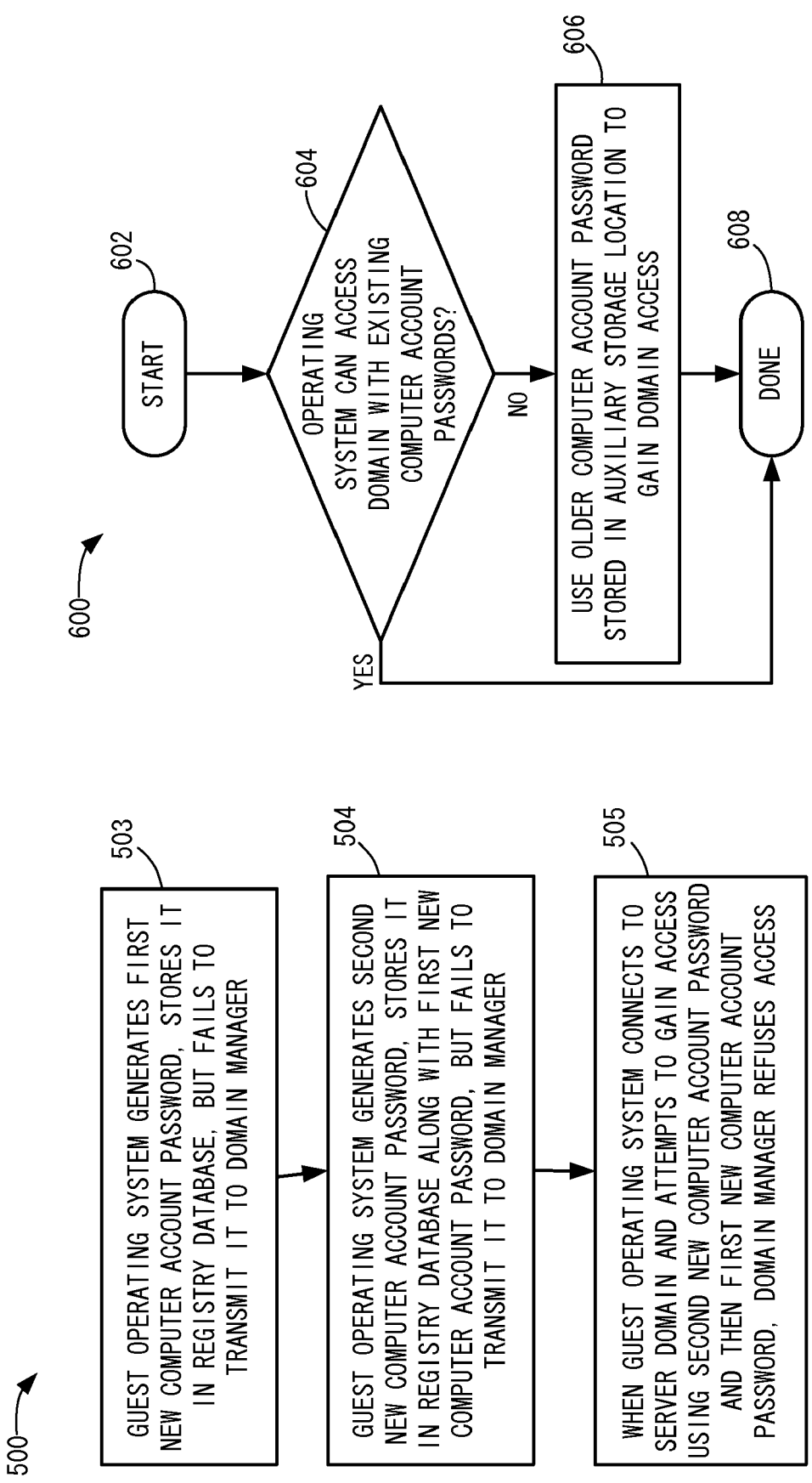

MAINTAINING THE DOMAIN ACCESS OF A VIRTUAL MACHINE

BACKGROUND

Enterprise computer networks often rely on a domain controller such as Active Directory® from Microsoft Corporation to manage security aspects of the network. The domain controller manages a logical group of computers and devices on the network as a domain. Each computer and each user are individually authenticated and granted an "account" which gives them access to network resources when they are added to the domain.

The computer accounts provide a means for authenticating computers connecting to the network, and to deny access to computers for which a computer account has not been provided. Thus, computer accounts are distinct from user accounts, which generally allow users to access a domain's network from any computer on the domain. Only authenticated users given domain administrator privileges can issue computer accounts to add a computer to the domain. Like user accounts, computer accounts may be authenticated using passwords. Computer account passwords are maintained and managed by the computer's operating system in a manner generally transparent to the user. In systems running Microsoft Windows operating systems, the computer account password is maintained in a system registry database that is managed by the operating system. Microsoft Windows operating systems typically maintain the current computer account password and only the most recent computer account password in the system registry.

Computer account passwords are generally computer-generated (for example, as a 128-bit or larger random number) without user input at a configurable periodic interval (for example, a periodic interval determined by a registry database variable such as MaximumPasswordAge) according to a domain policy. In Microsoft Windows® operating systems, the computer account password is stored as a secret (for example, $MACHINE.ACC) in a part of the registry database that is secure, such as the Local Security Authority (LSA) Policy Database. Although this discussion relates specifically to Microsoft's implementation of domain-architected networks and operating systems, it should be understood that the principles described herein apply equally to other domain controller software and other guest operating systems.

In virtualized computer systems, virtual disk image files maintained by the virtualization software contain images of virtual disks. Each virtual disk may be accessed by a guest operating system running inside a virtual machine as though it is a physical disk. However, read and write requests to various sectors of the virtual disk issued by the virtual machine are mapped to specific offsets within the corresponding virtual disk image file. Because the virtual disk image is stored as a file by the virtualization software, it is a fairly simple matter to take a snapshot of the virtual machine at a particular point in time to preserve the state of the virtual machine, so that changes made after the snapshot is taken can be discarded. This might be useful in many circumstances. For example, a virtual machine that becomes corrupted may be reverted to the previous snapshotted state to recover data that may otherwise be lost.

A snapshot preserves the state and data of a virtual machine at a specific point in time. The state of the virtual machine includes the virtual machine's power state (powered on, powered off, suspended, etc), contents of its memory (including random access memory, the processor contents, etc.) and disk state. When a virtual machine is powered off, the state is primarily the contents of the virtual disk.

Snapshots may be implemented in various ways, which are generally known in the art. See, for example "Understanding and Exploiting Snapshot Technology for Data Protection, Part 1: Snapshot Technology Overview" (IBM, Apr. 26, 2006) for exemplary techniques for implementing snapshots. In one implementation, a virtual disk image file is snapshotted by simply setting the file as read-only and redirecting all future writes to a new file. The new file, sometimes referred to as a redo log or copy-on-write table, contains only changes to the snapshot image. Future reads are directed to the new file when the disk sector being read has been modified since the snapshot was taken, and to the snapshot file when the disk sector being read has not been modified.

When a virtual disk is reverted to a previous state defined by a snapshot, all the changes to the virtual disk since the snapshot was taken are discarded. This includes new computer account passwords stored in the system registry by the guest operating system. Potentially, this can cause a computer to lose access to the domain, which would require a domain administrator to reset the computer account for that computer.

SUMMARY

The domain access of a virtual machine may be maintained, according to one embodiment, by identifying a generation of a new computer account password by an operating system, copying the new computer account password to an auxiliary storage location, determining that a file system of the computer has been restored to a previous state; and replacing an existing computer account password with the new computer account password. The new computer account password is used by the operating system of the computer to access the domain. The copying of the new computer account password may be performed in response to the generation of the new computer account password. The replacing of the existing computer account password may be performed in response to the restoring of file system to the previous state.

In another embodiment, a method for reverting a virtual machine that prevents loss of domain connectivity includes identifying a target snapshot, the target snapshot representing a state of the virtual machine at a particular time prior to a current time, reverting all changes written to a virtual disk since the creation of the target snapshot, retrieving a current password corresponding to the virtual machine, and overwriting an old copy of the password contained in the virtual disk with the current password retrieved from the auxiliary storage.

BRIEF DESCRIPTION OF THE DRAWINGS

FIGS. 4A and 4B show flowcharts illustrating, by way of example, procedures for maintaining the domain access of a virtual machine.

FIG. 5 is a sequence diagram illustrating a use case involving a limit on persistently stored computer account passwords.

FIG. 6 is a flowchart showing, by way of example, a procedure for maintaining the domain access of the virtual machine that overcomes the limit on persistently stored computer account passwords.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
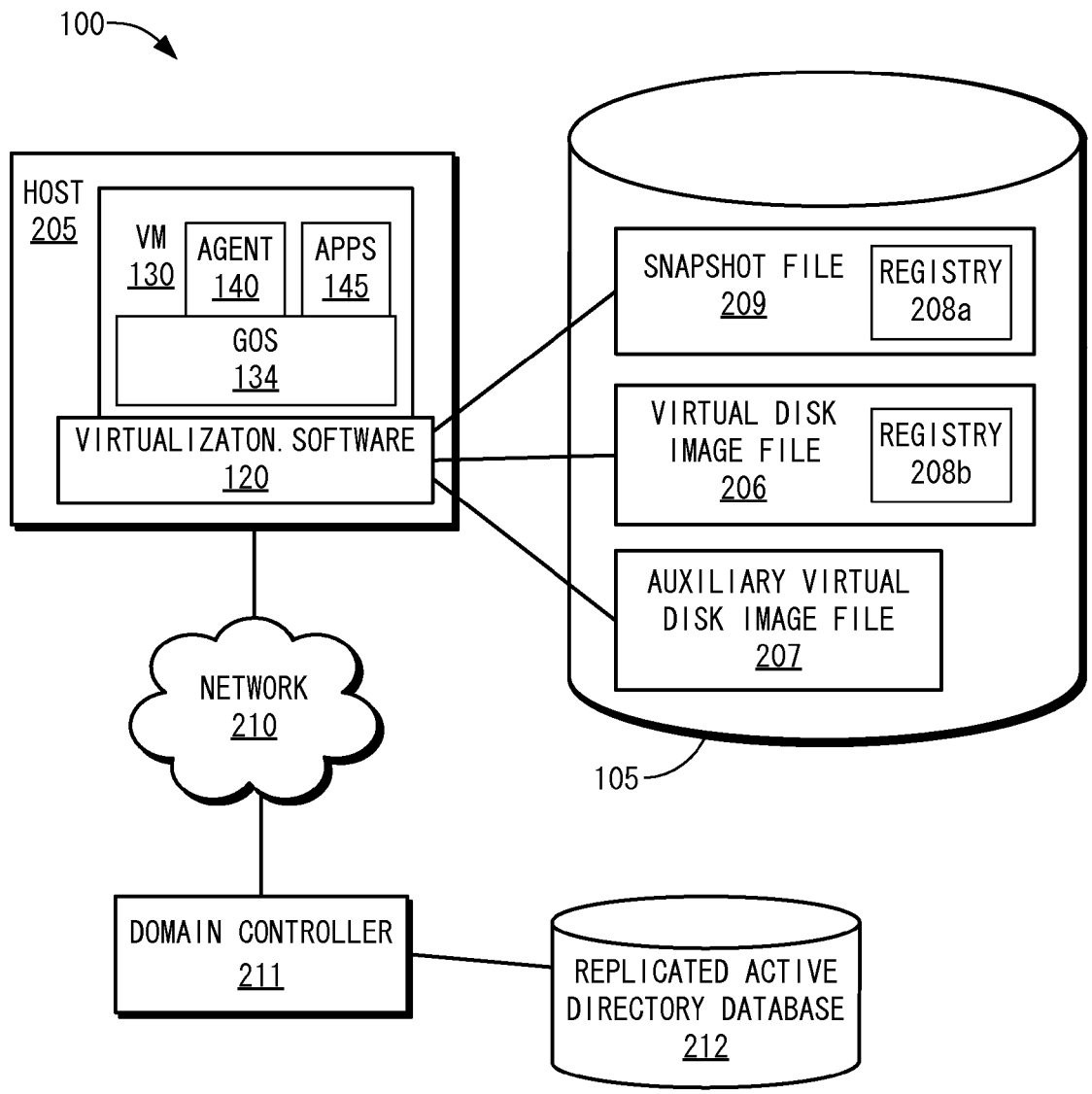
FIG. 1 shows a schematic diagram of a network system.

FIG. 1 is a schematic diagram of a network system 100. Host 205 comprises a physical computer system running virtualization software 120 such as VMware® ESX® and one or more virtual machines 130 (only one shown). Each virtual machine 130 includes guest system software including guest operating system 134, agent 140, and applications ("APPS") 145. Operating system 134 may be any commodity or purpose-built operating system compatible with the virtualization software, and applications 145 may be any software installed for carrying out the purpose of the virtual machine. Agent 140 may be instantiated as a system service, or "daemon" that runs in the background during operation of the virtual machine. Agent 140 may be implemented to carry out operations internally of virtual machine 130 either autonomously or on behalf of management software described below with reference to FIG. 2, with which agent 140 may be in communication.

Host 205 is connected to domain controller 211 over network 210, which may be any type of computer network and may include an Internet connection, e.g., using VPN (virtual private network) technology. Domain controller 211 includes a physical or virtual computer system running, in one embodiment, an instance of domain controller software such as Active Directory® from Microsoft Corporation. Domain controller 211 might access a replicated active directory database 212 to store data related to the domain, including computer account passwords for computers in the domain. Microsoft Active Directory allows domain controllers to restrict the access to the resources of the domain's network to computer systems that have been given a computer account.

Host 205 is also coupled to storage system 105, which may include one or more internal and/or external disk drives. An external storage system may be implemented, as a SAN accessible over an iSCSI or Fibre Channel network connection. Storage system 105 includes a plurality of files that are accessible by host 205 and that are associated with virtual machine 130 including snapshot file 209, virtual disk image file 206, and auxiliary virtual disk image file 207. It will be recognized that virtual machine 130 may have a number of additional associated files accessed by virtualization software 120 to maintain and manage virtual machine 130, which are not shown here for purposes of clarity.

Snapshot file 209 contains a logical disk image of a main virtual disk for virtual machine 130 at a previous point in time. Virtual disk image file 206 is a logical disk image for the virtual disk of virtual machine 130 in its present state. By "logical disk image" it is meant that it may not contain a complete copy of the disk image, but may in fact conceptually represent the complete disk image by reference to another file. For example, virtual disk image file 206 may contain only changes to virtual machine snapshot 209, and snapshot 209 may rely on a yet earlier snapshot file (not shown) and contain only changes made since that earlier snapshot was created.

Auxiliary virtual disk image 207 provides, in one embodiment, a location for storing computer account passwords, as will be further described below. In an example embodiment, the auxiliary virtual disk image 207 might be hidden from a user of virtual machine 130 and/or have security features with respect to access and/or encryption similar to those provided by the LSA Policy Database in the Windows Server registry database. Auxiliary virtual disk image file 207 may be mapped to an auxiliary virtual disk that would be read/writable by guest operating system 134 as though it was a physical disk in the same manner as any other virtual disk to which guest operating system 134 has access. However, as described below in more detail, when virtual machine 130 is reverted using snapshot file 209, the reversion only applies to the virtual disk image file 206 corresponding to the main virtual disk of virtual machine 130; the auxiliary virtual disk image file 207 is maintained without reverting to an earlier state. Therefore, auxiliary virtual disk image file 207 maintains any current computer account passwords stored thereon regardless how far back in time virtual machine 130 is reverted.

In an embodiment where guest operating system 134 is a Microsoft Windows® operating system, virtual disk image file 206 may include registry database 208b for guest operating system 134 running on virtual machine 130. Registry database 208b is used by guest operating system 134 to store a computer account password for the domain that is controlled, at least in part, by the domain controller 211. Auxiliary virtual disk image file 207 may store a copy of that computer account password as described in more detail below. When guest operating system 134 creates a new computer account password, it transmits the new computer account password to domain controller 211 for storage in the replicated active directory database 212.

Figure 2:
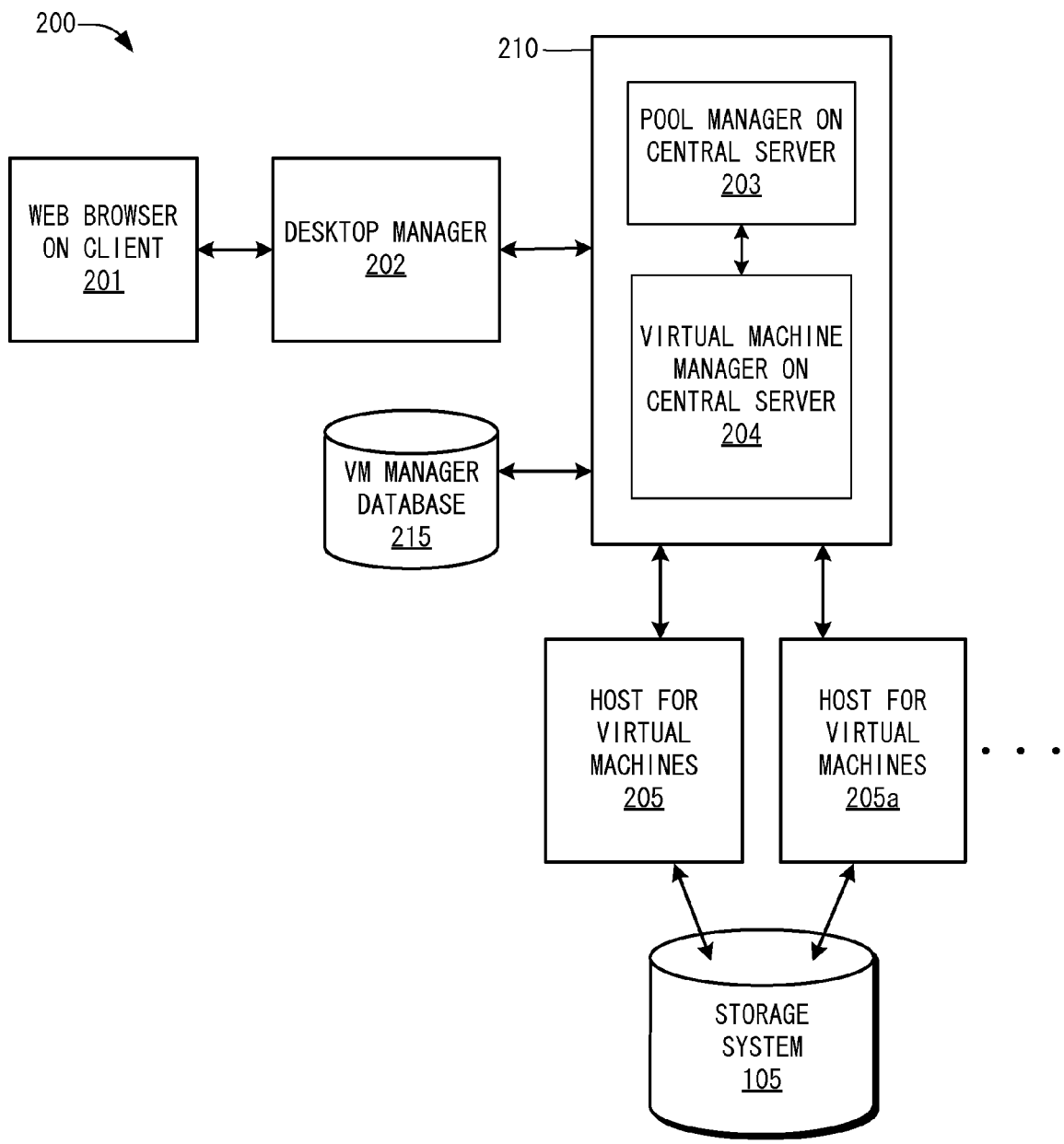
FIG. 2 is a schematic diagram of a desktop management system.

FIG. 2 is a schematic diagram of a desktop management system 200 for managing virtual desktops, in accordance with an example embodiment. It will be appreciated that the system might be used to manage a multitude of virtual machines such as virtual machine 130 depicted in FIG. 1. As depicted in FIG. 2, system 200 includes a web browser 201 running on a client, which might be a mobile device, laptop computer, desktop workstation, or other general purpose or special purpose system configured to provide web access to a user. Through a network (not shown) which may include a WAN (Wide Area Network), web browser 201 communicates with desktop manager 202 running on a server computer (which may also be running as a virtual machine). Desktop manager 202 exports a management console or user interface to web browser 201, allowing the user at client 201 to manage a plurality of virtual desktops. The term, "virtual desktop" refers to an interactive work environment accessible to a user and provided by a remote computer such as a virtual machine and system software running thereon. Each virtual desktop may provide remote users with access to productivity applications such as Microsoft Office® that users can access using a remote desktop client, such as a thin client or mobile device. In one embodiment, desktop manager 202 may be an implementation of VMware® View Manager™ that runs on a physical or virtual computer system.

As depicted in FIG. 2, desktop manager 202 communicates over a network (not shown) with a pool manager 203, or alternatively, with a virtual machine manager 204, both of which might run on a central server 210. In one embodiment, pool manager 203 may be an implementation of VMware® View™ Composer and virtual machine manager 204 may be an implementation of VMware® vCenter™ Server. If desktop manager 202 communicates with the pool manager 203, the pool manager 203 might, in turn, communicate (e.g., using inter-process communication) with the virtual machine manager 204, which in turn communicates over a network with a multitude of hosts 205, 205a, etc. Hosts 205, 205a (as well as any number of additional hosts) are connected to storage system 105 as described above with reference to FIG. 1. Alternatively, each host may rely on its own internal storage.

Pool manager 203 may be used to manage pools of virtual machines that are based on a single master virtual disk image file using linked clones. A linked clone is one of a plurality of virtual machines that have a common virtual disk image file. Referring briefly to FIG. 1, each linked clone references one of a plurality of virtual disk image files 206 (only one shown), wherein of the each virtual disk image files contain only changes to the same snapshot file 209 for the corresponding virtual machine. In practice, a "gold master" virtual machine may be created with an installed guest operating system 134 and applications 145 suitable for a class of users (e.g., a group of accountants in an enterprise) and then the virtual machine is powered down and then cloned using linked clone technology, wherein each clone corresponds to one of the users and has a corresponding virtual disk image file 206 that references snapshot file 209, which represents the pristine "gold master" virtual machine.

It should be noted that the configuration shown in FIG. 2 is merely for the purpose of illustration as an exemplary virtual machine management infrastructure. In alternate embodiments, pool manager 203 may reside on a separate computer system than virtual machine manager 204, and/or on the same server as desktop manager 202. Furthermore, each of these entities may themselves reside in virtual machines, either individually, or together, depending on the particular implementation. Although the management infrastructure is presented here in FIG. 2, it will become clear that, in certain embodiments, the management infrastructure is not required to practice the invention.

Figure 3:
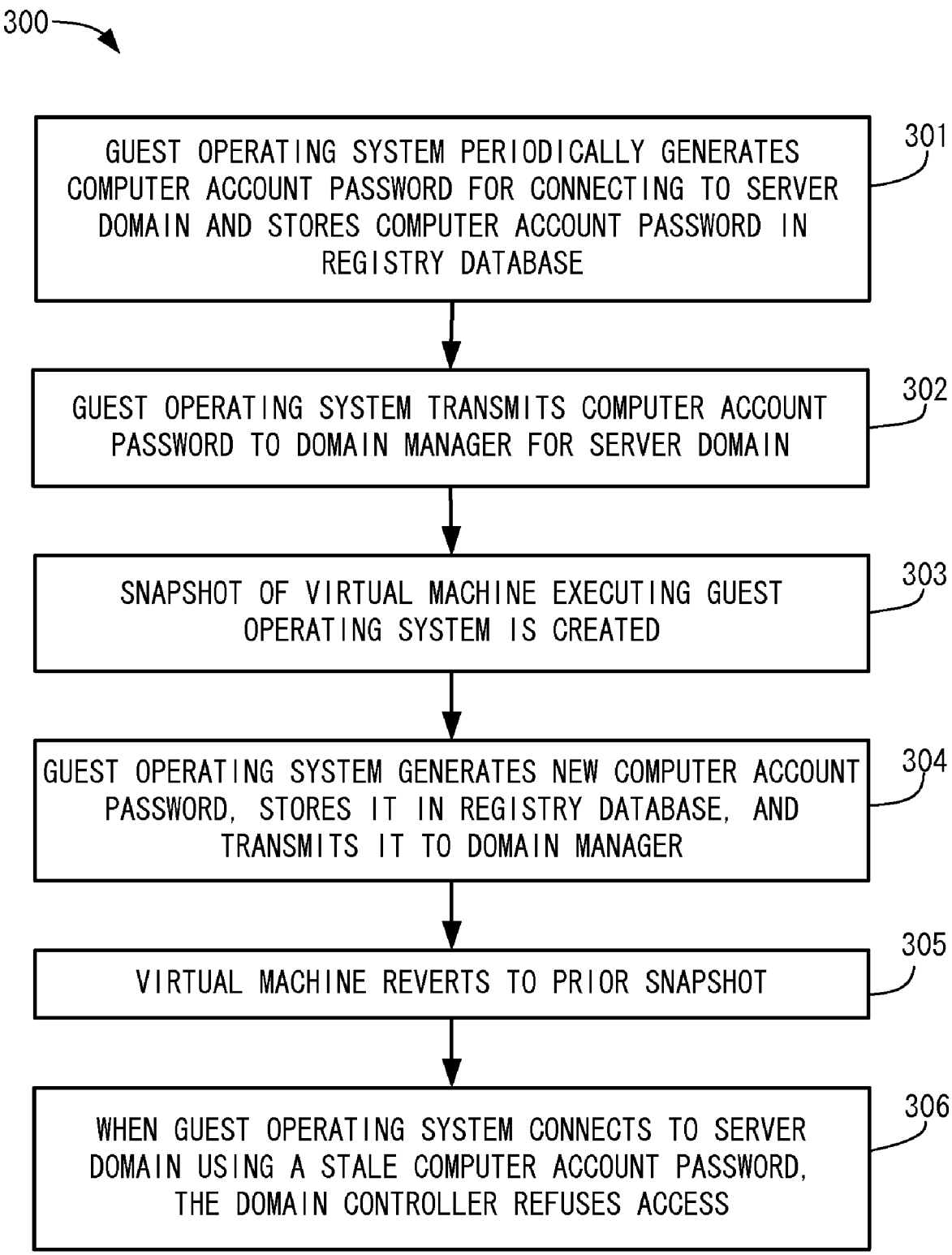
FIG. 3 is a sequence diagram illustrating a use case involving a virtual machine snapshot.

FIG. 3 is a sequence diagram illustrating a use case involving a virtual machine snapshot. In event 301 of the sequence depicted in FIG. 3, a guest operating system periodically generates a computer account password for accessing a server domain and stores the computer account password in a registry database. In event 302 of the sequence, the guest operating system transmits the computer account password to a domain manager for a server domain. It is typical in domain-architected networks for each computer or other resource to authenticate itself to the domain manager using passwords, which may be updated periodically, e.g., every month or as required by the policy implemented by a network administrator and enforced by the domain controller. As explained above, the computer account password is distinct from a user account password, and is used to ensure that only approved and trusted computers are granted access to network resources.

In event 303, a snapshot of the virtual machine executing the guest operating system is created. The snapshot may be created in response to a user or administrator request, in accordance with established policy of creating snapshots periodically for security or backup purposes, or automatically in response to various network or system events as may be configured by the administrator/user. Referring to FIG. 1, when the snapshot is created, snapshot file 209 contains all the state of virtual machine 130, including the current computer account password, which is stored in registry 208a. The snapshot itself may be created by the virtualization software 120 (FIG. 1) in response to a command received from virtual machine manager 204 (FIG. 2) which may in turn be carrying out instructions from desktop manager 202 or pool manager 203.

In event 304, at some point after the snapshot was created, the guest operating system 134 (FIG. 1) generates a new computer account password, stores it in the registry database 208b, and transmits it to the domain controller 211. In event 305, the virtual machine reverts to the snapshot created in event 303. Referring to FIG. 1, when virtual machine 130 is reverted to the snapshot, the changes to the virtual disk stored in virtual disk image file 206 are lost, including changes to the registry database stored in registry 208b. Therefore, the current computer account password is no longer part of the virtual disk for the virtual machine.

In event 306 of the sequence, the guest operating system in the now-reverted virtual machine attempts to gain access to the network domain using the computer account password maintained in the snapshot, but the domain controller refuses access because that computer account password is stale. In other words, the computer account password stored with the virtual machine snapshot grows stale and no longer usable when it is later updated in operation 304. The problem is caused by reverting the virtual machine to a previous state and changes to the computer account password are lost along with other changes to the virtual machine since the snapshot was taken.

FIGS. 4A and 4B show flowcharts 400, 450, respectively, showing, by way of example, procedures for maintaining the domain access of a virtual machine. It will be appreciated that these procedures address the use case described above with reference to FIG. 3.

Flowchart 400 illustrates, by way of example, a method for maintaining a computer account password in an auxiliary storage location. The method begins as indicated by start block 402 and proceeds to operation 404 wherein it is determined whether the guest operating system has generated a new computer account password. If the guest operating system is a Microsoft Windows® operating system, it will generally periodically generate and store new computer account passwords in the registry database, and transmit them to the domain controller. The frequency of computer account password generation may be determined based on a policy of the domain manager, set by a domain administrator. Referring to FIG. 1, agent 140 can determine whether a new computer account password has been created by checking the location containing an existing computer account password (for Microsoft Windows® operating systems, the registry) to determine if the existing computer account password has been replaced with a new one. For example, agent 140 may subscribe to an event that is fired when the password is changed. Agent 140 then fetches the updated password from the registry and saves to the auxiliary storage location. In an alternative embodiment, Agent 140 may maintain a hash of the existing computer account password, and compare this hash with a newly calculated hash of the computer account password in the registry database. If the two hash values differ, then it can be determined that a new computer account password has been created. When a new computer account password is created, the procedure flows to operation 406.

In operation 406, a version number corresponding to the computer account password is stored in the registry database along with the computer account password. In one embodiment, agent 140 (FIG. 1) running in virtual machine 130, monitors guest operating system 134 for events related to the generation of a new computer account password. Each time a new computer account password is generated, either immediately or at some time thereafter, agent 140 increments the existing version number stored in registry 208. If no version number is present, a new registry value representing the computer account password version number may be added and the new registry value is initialized, e.g., at the value "0". The version number might be an integer serial number that increases with each change in the version number, for example, 1, 2, 3, 4, etc. However, any other suitable version numbers might be used in alternative example embodiments, including decreasing numbers, alphanumeric numbers, letters, etc. An incrementing version number may "roll over," i.e., back to zero (or other arbitrary value), after it reaches a maximum value, such as 255 for an 8-bit version number or 65535 for a 16-bit version number, or any arbitrary maximum value.

In operation 408, the new version number and the corresponding computer account password that was just created are stored in an auxiliary storage location. In one embodiment, the auxiliary storage location is in a file on auxiliary virtual disk image 207 discussed above with reference to FIG. 1. In this embodiment, agent 140 stores the new computer account password along with the new corresponding version number directly in an auxiliary virtual disk mapped by virtualization software 120 to auxiliary virtual disk image file 207. As explained previously, auxiliary virtual disk image file 207 is similar to main virtual disk image file 206 in that it is accessible by guest system software as if it were an ordinary disk drive, but it may be significantly smaller in terms of capacity and its existence may be hidden from the end user of virtual machine 130.

In another embodiment, agent 140 passes the computer account password and corresponding version number in a secure manner to the virtual machine manager 204 (FIG. 2), or pool manager 203, which then stores the computer account password and corresponding version number in database 215 (FIG. 2) or other storage location that is associated with virtual machine 130, e.g., by an index identifier that identifies virtual machine 130.

Any number of prior computer account passwords and corresponding version numbers may be maintained in the auxiliary storage location, provided the auxiliary storage location is large enough to maintain the history of computer account passwords and version numbers. In one embodiment, all computer account passwords less than a year old or less than 2 years old are retained. In another, the 500 most recent computer account passwords are retained. Thus, the total number of computer account passwords may be limited by space or by time, or both, and may depend on the implementation or by administrator policy.

Once the version number and corresponding computer account password are stored in the auxiliary storage location, the procedure ends as indicated by done block 410.

Flowchart 450 shows, by way of example, a method for restoring a current computer account password to a reverted virtual machine. The procedure begins as indicated by start block 452 and flows to operation 454 wherein it is determined whether the virtual machine has reverted to a previous state. This step may be performed implicitly by identifying in the next operation whether the version numbers in the registry differ from the version numbers in the auxiliary storage location. Alternatively, any of a variety of mechanisms may be put into place to determine when a virtual machine is reverted. For example, when method 450 is performed by virtual machine manager 204 (FIG. 2) or other management entity, knowledge of when a particular virtual machine is reverted would be known since the command to revert the virtual machine may originate or pass through such a management entity, or information about the reversion may be stored in virtual machine manager database 215. Alternatively, agent 140 in virtual machine 130 may be informed of the reversion or recognize the reversion in various ways by communication with virtual machine manager 204 or other informed management entity.

As mentioned above with reference to FIG. 3, when a virtual machine is reverted to a previous snapshot, changes to the virtual disk since the snapshot was created are lost. Referring to FIG. 1, the effect of the reversion is to delete main virtual disk image file 206, which contains changes to snapshot file 209, and to start a new main virtual disk image 206. Any changes written to virtual disk image file 206 after snapshot 209 was taken are lost; this includes changes to the registry database 208. Therefore, the current computer account password updated in operation 401 is no longer stored on the virtual machine's virtual disk after the revert operation. However, the revert operation does not alter or revert the auxiliary storage location, such as auxiliary virtual disk image file 207, in which the computer passwords and version number were written in operation 408 of FIG. 4A.

Returning to FIG. 4B, when the virtual machine is reverted to a previous state (or by implication as mentioned above, the procedure flows to operation 456, in which it is determined whether the computer account password version number stored in the registry is different from the computer account password version number stored in the auxiliary storage location. If the version numbers are the same, then it can be assumed that the reverted virtual machine has a current computer account password and no update is required, and the procedure therefore ends as indicated by done block 460. However, if the version numbers differ, then the procedure flows to operation 458, wherein the registry database is updated with the latest computer account password and version number stored in the auxiliary storage. In one embodiment, this operation is carried out by agent 140 (FIG. 1). In another embodiment, the registry entry is updated at the time of the reverting by the virtual machine manager, either by retrieving the new value from auxiliary virtual disk image 207 or other auxiliary storage location as mentioned above with reference to operation 408, and replacing the password and corresponding version number in registry 208*b* after the reversion.

In an alternate embodiment, version numbers are not maintained. Instead, each time a new computer account password is created by the guest operating system, it is copied to the auxiliary storage location, and each time the virtual machine is reverted, the computer account password stored in the auxiliary storage location is copied to the registry of the reverted virtual machine. In yet another alternate embodiment, every time the computer account password is changed, the new computer account password is written into each prior snapshot image of the virtual machine, so that if an when the virtual machine is reverted, the reverted image already contains the new computer account password.

FIG. 5 shows sequence diagram 500 illustrating a use case involving a limit imposed by operating systems on persistently stored computer account passwords. In event 503 of the sequence, the guest operating system generates a first new computer account password, stores it in the registry database, but fails to transmit it to the domain manager. The transmission failure might occur due to problems with or lack of network connectivity. In event 504, the guest operating system generates a second new computer account password, stores it in the registry database along with the first new computer account password, but again fails to transmit it to domain manager. In event 505, the domain manager refuses access when the guest operating system connects to the server domain and attempts to gain access using the second new computer account password and then the first new computer account password.

In the use case described in FIG. 5, the guest operating system stores two computer account passwords in the registry database. For example, Windows XP and Windows Server operating systems store only the two most recent computer account passwords in the local security authority (LSA) policy database. In other example embodiments, the guest operating system might store only one computer account password or might store more than two, but a small limited number, of computer account passwords. However, regardless of the number of account passwords stored, there is still the risk that a particular computer can be prevented from accessing a domain because none of the stored passwords match an earlier password that was most recently successfully transmitted to the domain controller, which is the one password the domain controller requires in order to grant access to network resources.

FIG. 6 is a flowchart 600 showing, by way of example, a procedure for maintaining the domain access of the virtual machine that overcomes the limit on persistently stored computer account passwords described above with reference to FIG. 5. This procedure relies on storing new computer account passwords in an auxiliary storage location as described above with reference to FIG. 4A. The procedure begins as indicated by start block 602 and proceeds to operation 604, wherein it is determined whether the operating system can access the domain server with the computer account passwords retained by the operating system. If so, then the procedure ends as indicated by done block 608. However, if the operating system cannot access the domain with the computer account passwords retained by the operating system, then the procedure flows to operation 606.

In operation 606, older computer account passwords stored in the auxiliary storage location in operation 408 are used until one is accepted by the domain manager. The procedure then ends as indicated by operation 460.

As can be seen from the above discussion, the procedure illustrated with reference to FIG. 6 involves accessing older computer account passwords that are stored in the auxiliary storage location. Version numbers may be helpful in sequentially testing older and older passwords up to some threshold. For computers running Microsoft Windows®, the version number selected initially may be less (i.e., older) than those two version numbers stored in the system registry. In one embodiment, the latest computer account password and corresponding version number in the registry database may be replaced with the older computer account password and its corresponding version number retained in the auxiliary storage location. In an alternative example embodiment, the second latest computer account password and version number in the registry database may additionally be replaced with an even older computer account password and version number from the auxiliary storage location. once the replacement is performed, the operating system may be triggered to attempt to join the domain again using the replaced computer account password(s) using known techniques.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. For example, the foregoing inventions might be applied to maintain access when access is disrupted by reversion to a snapshot which is not a virtual machine snapshot, e.g., a file system snapshot. Also it will be appreciated that there are many other possible orderings of the operations in the processes described above and many possible modularizations of those orderings. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

What is claimed is:

1. A method for retaining access by a computer to a domain, the method comprising:
   identifying a generation of a new computer account password by an operating system, the new computer account password being used by an operating system of the computer to access the domain;
   copying the new computer account password to an auxiliary storage location in response to the identifying of the generation of the new computer account password;
   determining that a file system of the computer has been restored to a previous state; and
   replacing an existing computer account password with the new computer account password in response to the determining that the file system of the computer has been restored to the previous state.

2. The method of claim 1, wherein the computer is a virtual machine, and the file system is restored to a previous state by reverting the virtual machine to a previous snapshot.

3. The method of claim 2, wherein:
   the virtual machine runs on a physical computer system by way of virtualization software; and
   the auxiliary storage location comprises an auxiliary virtual disk that is mapped by the virtualization software to an auxiliary virtual disk image file, the auxiliary virtual disk image file being retained in its current state when the virtual machine is reverted.

4. The method of claim 3, wherein:
   the file system is implemented on a virtual disk that is mapped to a main virtual disk image file by the virtualization software; and
   the reverting of the virtual machine comprises discarding changes made to the virtual disk since the virtual machine was snapshotted.

5. The method of claim 1, wherein the identification of the generation of the new computer account password and the copying of the new computer account password to the auxiliary storage location is carried out at least in part by an agent process that runs in the background on the computer.

6. The method of claim 5, wherein the copying of the new computer account password to the auxiliary storage location comprises sending the new computer account password to a management process, the management process running on another computer.

7. The method of claim 6, wherein the auxiliary storage location comprises a database accessible by the management process.

8. The method of claim 1, wherein the identifying of the generation of the new computer account password comprises checking a location where the operating system stores the computer account password to see whether a previous computer account password has been replaced.

9. The method of claim 1, further comprising:
creating a new version number corresponding to the new computer account password in response to the new computer account password being generated;
storing the new version number in the file system of the computer; and
storing the new version number in the auxiliary storage location.

10. The method of claim 9, wherein the creating of the new version number comprises incrementing an existing version number.

11. The method of claim 9, wherein the new version number is stored in the auxiliary storage location with the new computer account password in a manner that associates the new computer account password with the corresponding new version number.

12. The method of claim 9, wherein the storing of the new computer account password and the corresponding new version number in the auxiliary storage location comprises adding the new computer account password and corresponding new version number to a list of previous computer account passwords and corresponding previous version numbers.

13. A method for reverting a virtual machine, the method comprising:
identifying a target snapshot, the target snapshot representing a state of the virtual machine at a particular time prior to a current time;
reverting all changes written to a virtual disk since the creation of the target snapshot;
retrieving a current password corresponding to the virtual machine from an auxiliary storage location;
overwriting an old copy of the password contained in the virtual disk with the current password retrieved from the auxiliary storage location wherein the overwriting operation occurs if a version number associated with the current password is determined to be later than the version number in the target snapshot.

14. A method as in claim 13, wherein the determination is performed by a guest agent running within a virtual machine.

15. The method of claim 13, wherein the overwriting of the old copy of the password occurs in each prior snapshot of the virtual disk, before the reverting of all the changes.

16. The method of claim 13, wherein the overwriting of the old copy of the password occurs after the reverting of the changes, the retrieving of the current password comprising retrieving the current password from an auxiliary storage location that is unaffected by the reverting.

17. A non-transitory machine readable storage medium embodying computer software for retaining access by a computer to a domain, the computer software causing a computer to perform a method, the method comprising:
identifying a generation of a new computer account password by an operating system, the new computer account password being used by an operating system of the computer to access the domain;
copying the new computer account password to an auxiliary storage location in response to the identifying of the generation of the new computer account password; and
replacing an existing computer account password with the new computer account password when the file system of the computer has been restored to the previous state.

18. The non-transitory machine readable storage medium of claim 17, wherein the auxiliary storage location comprises an auxiliary disk, the auxiliary disk being retained when the file system is restored to the previous state.

19. The non-transitory machine readable storage medium of claim 17, wherein the software is an agent process that runs in the background on the computer.

20. The non-transitory machine readable storage medium of claim 17, wherein the copying of the new computer account password to the auxiliary storage location comprises sending the new computer account password to a management process, the management process running on another computer.

21. The non-transitory machine readable storage medium of claim 17, wherein the identifying of the generation of the new computer account password comprises checking a location where the operating system stores the computer account password to see whether a previous computer account password has been replaced.

22. The non-transitory machine readable storage medium of claim 17, wherein the method further comprises:
creating a new version number corresponding to the new computer account password after a new computer account password is generated;
storing the new version number in the file system of the computer; and
storing the new version number in the auxiliary storage location.

23. The non-transitory machine readable storage medium of claim 22, wherein the creating of the new version number comprises incrementing an existing version number.

24. The non-transitory machine readable storage medium of claim 22, wherein:
the new version number is stored in the auxiliary storage location with the new computer account password in a manner that the new computer account password can be identified by the corresponding new version number; and
the storing of the new computer account password and the corresponding new version number in the auxiliary storage location comprises adding the new computer account password and corresponding new version number to a list of previous computer account passwords and corresponding version numbers.

* * * * *